June 7, 1938.  J. L. HILTON  2,119,990
BALL AND ROLLER BEARING
Filed Feb. 17, 1937
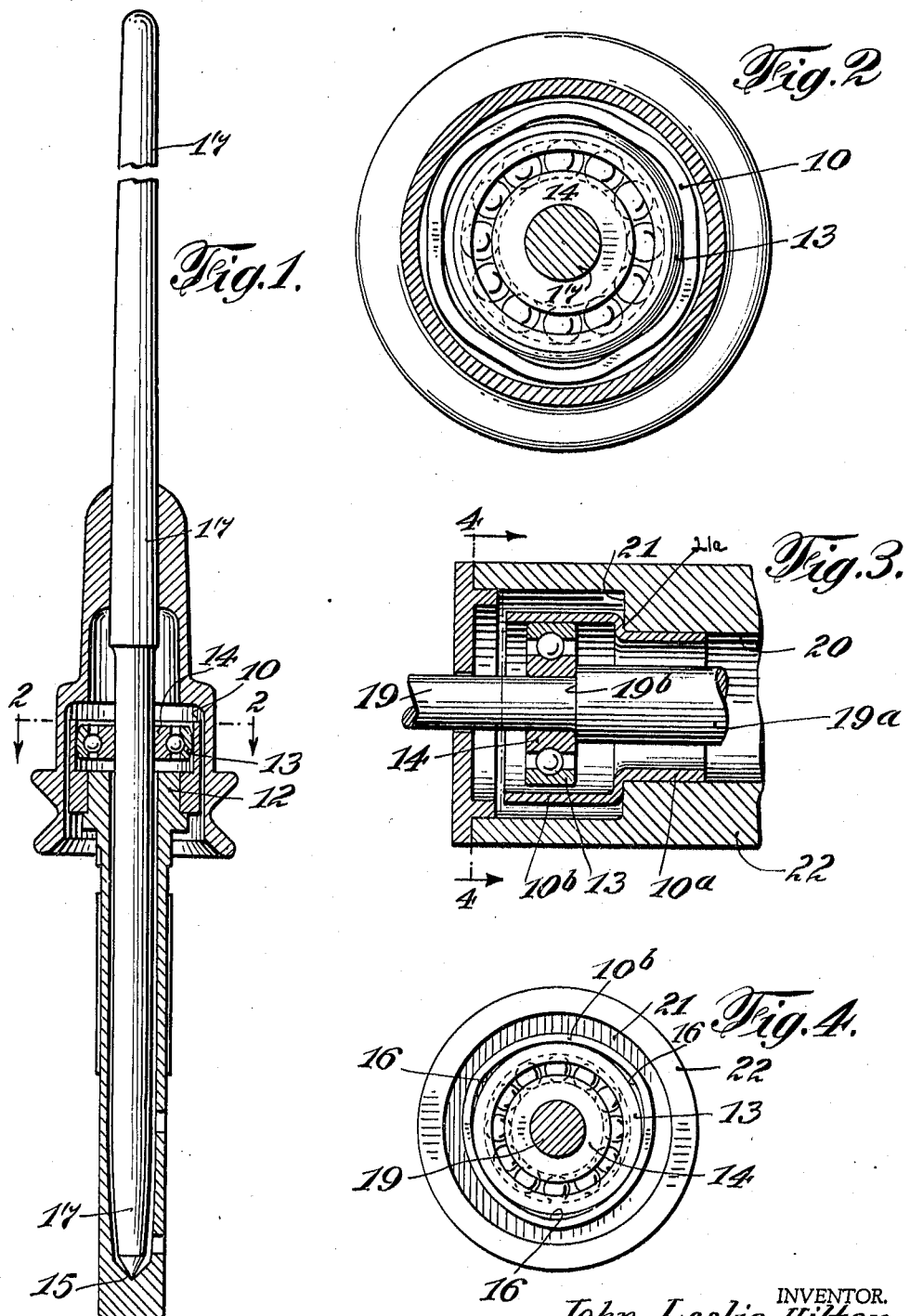
INVENTOR.
John Leslie Hilton
BY
his ATTORNEY.

UNITED STATES PATENT OFFICE 2,119,990

BALL AND ROLLER BEARING

John Leslie Hilton, Chelmsford, England, assignor to Norma-Hoffmann Bearings Corporation, Stamford, Conn., a corporation of New York Application February 17, 1937, Serial No. 126,295
In Great Britain March 4, 1936

2 Claims. (Cl. 308—184)

Ball and roller bearings are usually mounted in such manner that the outer races fit closely in their housings, for example, so as to avoid creep. In consequence, accurate machining to fine limits of the two members is necessary in order that the required lateral alignment of the members can be obtained.

Such accuracy of machining of the two members is rendered unnecessary for many arrangements employing ball and roller bearings, by the invention.

It is to be understood that in arrangements embodying the invention a crimped sleeve itself forms the housing for the outer race of the bearing, and is to be contrasted with an ordinary liner having concentric cylindrical surfaces interposed between a ball race and a housing provided in the usual manner by a bore in a rigid body. In the latter case, the liner where it supports the bearing is "backed" by the rigid member or housing embracing it to provide support in a radial direction.

The crimped sleeve forming this invention where it supports the bearing, is not backed by any rigid member embracing it. This crimped sleeve may be suitably formed by distorting a true hollow cylinder of metal locally or at different points of its circumference so as to form a number of flats in the cylindrical walls. By this means the sleeve is given a resilience which is sufficient to enable it to grip a member such as the outer race of a ball bearing on which it is fitted, but the resilience is not such as will permit the part on which the inner race is fitted to gyrate with respect to the housing to such degree as it would were springs interposed between the outer race and a rigid fixed housing as has already been proposed to accommodate for errors of dynamic balance.

The crimped sleeve, may, for example, be arranged as an extension member fixed to or formed integral with one of the relatively rotatable members to form the housing for the outer race of a ball bearing, the inner race being fixed to the other member, e. g., a spindle. The latter member with the complete bearing may then be assembled in position by thrusting the bearing into the sleeve.

In order to provide for initial errors of static alignment, according to a further feature of the invention the outer race may be provided with a rounded or crowned outer surface. Furthermore, the bearing is easily withdrawable as a whole with the shaft or spindle blade to which the inner race is affixed and thus damage to the rolling elements during such withdrawal and later insertion is avoided.

The invention is illustrated by way of example in the accompanying drawing, in which:—

Figure 1 is a vertical section of a spindle mechanism provided with a crimped sleeve fixed rigidly to the upper end of the flexible tube of the spindle;

Figure 2 illustrates a sectional view of a crimped sleeve and ball bearing taken on the line 2—2 of Fig. 1;

Figure 3 shows a longitudinal section of a shaft and bearing combined with this invention; and Figure 4 is a section on line 4—4 of Figure 3.

Referring to Fig. 1, the crimped sleeve 10 is fixed to the upper end of the known flexible tube 12. The sleeve 10 is provided to form the housing for the outer race 13 of a ball bearing the inner race 14 of which seats tightly on the blade 17 and the sleeve 10 is arranged so as to have sufficient resilience to grip the outer race 13 and prevent creep, but to permit the spindle with the bearing to be withdrawn from and inserted in the tube 12 at will. The sleeve 10 may be formed integral with the tube 12 if desired.

The outer race 13 has a rounded or crowned outer surface as seen in Fig. 1 so that if the other bearing shown as a conical bearing 15 which accommodates the lower end of the blade 17 is not coaxial with the crimped housing, the outer race can align itself with the inner race.

While the invention thus provides an improved construction of a spinning or twisting spindle, it will be appreciated that the invention may be applied to other uses.

In Figure 3 another embodiment of the invention is shown. In this, the housing 22 has a recess 20 extending to shoulder 21. Within the recess 20, a cylindrical sleeve 10b having a sub-caliber portion 10a is inserted, and the portion 10a moved to the shoulder 21, a shoulder 21a being disposed between these two parts of the sleeve. The exterior of the sleeve 10b is cylindrical, that is, it is not provided with the hill and valley configuration shown on the exterior of the sleeve in Figure 2, though it may be so formed. The interior of sleeve 10b is, however, provided with this hill and valley configuration, and the outer race 13 is fitted into the sleeve as before described. The inner race 14 is secured to a shaft 19 and abuts against a shoulder 19b. In this embodiment, the ball bearing is supported within the sleeve 10b at a distance from the place where the sleeve 10a is supported. The bearing is readily withdrawable as a whole with the shaft.

This invention is equally applicable to other structures than that shown.

It is obvious that various changes and modifications may be made in the details of construction and design of the above specifically described embodiments of this invention without departing from the spirit thereof, such changes and modifications being restricted only by the scope of the following claims.

Having now particularly described and ascertained the nature of my said invention and in what manner the same is to be performed, I declare that what I claim is:—

1. In a bearing arrangement for relatively rotatable members having a shaft, an inner race ring secured to said shaft, an outer race ring, and antifriction members interposed between said inner and outer race ring, the combination therewith of a support, a cylindrical sleeve secured to said support and extending from said support and over said outer race ring to include the same and the inner race ring and antifriction bearings, and having the portion embracing said outer race ring free of said support, the interior of said sleeve at said portion having an undulating configuration, the hill portions of which contact with the outer race ring, the cylindrical sleeve at its end opposite that end where it is secured to the support having an open end, whereby the shaft with said inner and outer races and antifriction members may be removed by sliding disengagement from said sleeve.

2. In a bearing arrangement for relatively rotatable members having a shaft, an inner race ring secured to said shaft, an outer race ring the outer surface of which is longitudinally curved, and antifriction members interposed between said inner and outer race ring, the combination therewith of a support, a cylindrical sleeve secured to said support and extending from said support and over said outer race ring to include the same and the inner race ring and antifriction bearings, and having the portion embracing said outer race ring free of said support, said sleeve being circumferentially crimped to form exterior and interior undulating configurations, the hill portions of which contact with the curved outer surface of the outer race ring, the cylindrical sleeve at its end opposite that end where it is secured to the support having an open end, whereby the shaft with said inner and outer races and antifriction members may be removed by sliding disengagement from said sleeve.

JOHN LESLIE HILTON.